C. WEHNER.
IMPLEMENT FOR DESTROYING REVENUE STAMPS ON BEER CASKS.
APPLICATION FILED NOV. 12, 1912.
1,080,312.
Patented Dec. 2, 1913.
2 SHEETS—SHEET 1.
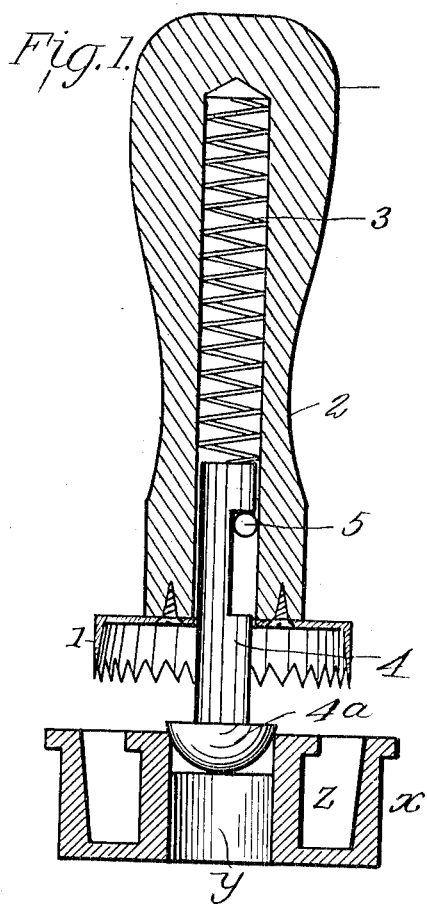
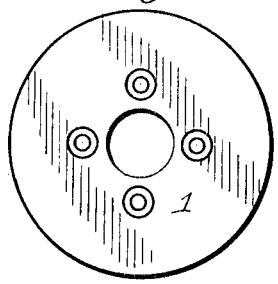
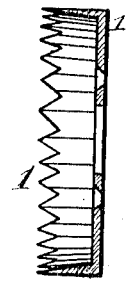
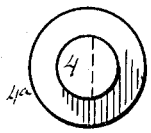
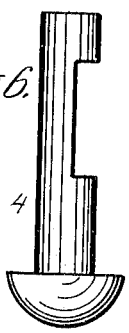
Witnesses
John E. Moberg
Frank Austr
Inventor
Caspar Wehner

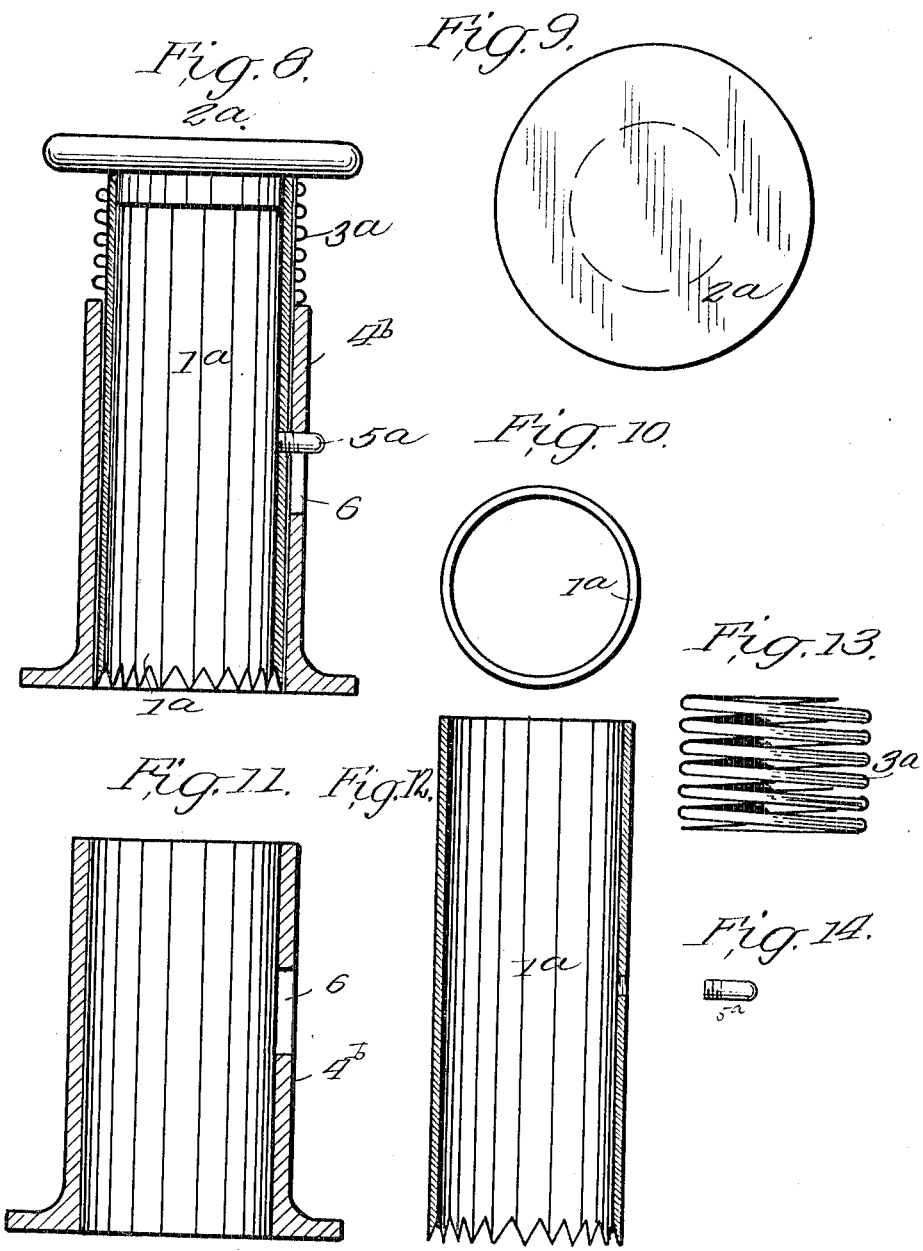

UNITED STATES PATENT OFFICE.

CASPAR WEHNER, OF CENTRAL CITY, SOUTH DAKOTA.

IMPLEMENT FOR DESTROYING REVENUE-STAMPS ON BEER-CASKS.

1,080,312.

Specification of Letters Patent.

Patented Dec. 2, 1913.

Application filed November 12, 1912. Serial No. 730,979.

*To all whom it may concern:*

Be it known that I, CASPAR WEHNER, a citizen of the United States, and a resident of Central City, in the county of Lawrence and State of South Dakota, have invented an Improved Implement for Destroying Revenue-Stamps on Beer-Casks, of which the following is a specification.

Revenue stamps are commonly applied to beer-casks by pasting them on the metal bushings into which faucets or spigots are driven for drawing off the contents of the casks.

My invention is a tool or implement adapted for cutting out the central portion of such stamps so that it may not be forced into the casks when the spigots are being driven into the bushings.

The details of construction and combination of parts are hereinafter described, and illustrated in the accompanying drawings, in which—

Figure 1 is a longitudinal section of my improved implement, including a cross section of a metal bushing such as commonly attached to beer-casks for the reception of a spigot. Figs. 2 to 7, inclusive, are different views of the several disassociated parts comprising my device. Fig. 8 is a longitudinal section of a modification. Figs. 9 to 14, inclusive, are different views of the disassociated parts comprising such modification.

I will first describe the preferred form of implement illustrated in Figs. 1 to 7, inclusive. The numeral 1 indicates a circular, metal stamp-cutter having a serrated edge and secured by screws to the flat end of a wooden handle 2, which is provided with a central bore to receive a spiral spring 3 and the stem or shank 4 of a centering device having a solid semicircular head $4^a$. The expansion of the spring 3 obviously tends to project said device from the handle and below the cutter 1, and to limit this movement I employ a cross-pin 5 which engages a shoulder on the stem or shank 4, the latter being cut out laterally to accommodate the pin. In Fig. 1, the stamp-cutter is shown applied, as in practice, to a metal bushing $x$ such as is commonly used on beer-casks for the reception of a tap or spigot. As shown, the bushing has a central opening to receive the spigot which is driven into the cask, the said opening being temporarily closed by a plug $y$ during shipment of the cask. The central opening is surrounded by an annular one $z$, and over the face of the bushing a revenue stamp is pasted. Upon applying my improved implement, the head $4^a$ enters the outer end of the central opening in the bushing and thus serves to center the cutter 1 and its attached handle, as will be readily understood; then upon applying due pressure to the handle, the serrated edge of the cutter is forced into the stamp where it spans or extends across the annular opening in the bushing and thus severs the central portion of the stamp from the outer portion. The central portion of the stamp may then be readily removed preparatory to introduction of the tap or spigot.

In the modification illustrated in Figs. 8 to 14, inclusive, the cutter $1^a$ is a cylinder having a handle $2^a$ applied to its upper end. This part $1^a$ is adapted to slide in a cylindrical guide or keeper $4^b$ and a spring $3^a$ is interposed between the latter and the handle $2^a$. A stop-pin $5^a$ projects laterally from the cutter $1^a$ and is adapted to work vertically in a guide slot 6 provided in the outer part or guide $1^a$. In practical use of this form of implement, the flange or horizontal base of the guide $4^a$ rests upon the outer rim of the bushing $x$ shown in Fig. 1 and the serrated edge of the cutter $1^a$ acts on the stamp in the same way and at the same point as the first-named cutter 1.

What I claim is:—

1. The improved revenue stamp cutter, comprising a part adapted to rest on a keg bushing during the cutting operation, a handle which is slidable on and guided by such part and provided at its lower end with a serrated circular cutting edge, a spring arranged between such part and the handle, and normally supporting the latter in raised position, and a cross pin attached to the handle and adapted to engage a shoulder on the fixed part for limiting the movement of the handle, as described.

2. The improved revenue stamp cutter, comprising a handle having a longitudinal bore and provided at its inner end with a circular cutter having a serrated edge, a centering device having a semicircular head and a shank adapted to slide in the bore of the handle and having a shoulder, a spring interposed between such shank and the outer end of the handle, and a stop-pin arranged transversely in the handle and adapted to
5 engage the shoulder of the aforesaid shank, as described.

In testimony whereof I have hereunto affixed my signature in the presence of two witnesses.

CASPAR WEHNER.

Witnesses:
JOHN E. MOBERG,
FRANK OURTT.

Copies of this patent may be obtained for five cents each, by addressing the "Commissioner of Patents, Washington, D. C."